US009229121B2

(12) United States Patent
Shin

(10) Patent No.: US 9,229,121 B2
(45) Date of Patent: Jan. 5, 2016

(54) SEISMIC IMAGING SYSTEM FOR ACOUSTIC-ELASTIC COUPLED MEDIA USING ACCUMULATED LAPLACE GRADIENT DIRECTION

(71) Applicant: Changsoo Shin, Seoul (KR)

(72) Inventor: Changsoo Shin, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 305 days.

(21) Appl. No.: 13/795,072

(22) Filed: Mar. 12, 2013

(65) Prior Publication Data

US 2013/0286775 A1     Oct. 31, 2013

Related U.S. Application Data

(60) Provisional application No. 61/610,070, filed on Mar. 13, 2012.

(51) Int. Cl.
*G06F 7/60*     (2006.01)
*G01V 1/28*     (2006.01)

(52) U.S. Cl.
CPC ....................... *G01V 1/282* (2013.01)

(58) Field of Classification Search
CPC ....................................... G01V 1/282
See application file for complete search history.

(56) References Cited

U.S. PATENT DOCUMENTS

| 2007/0282535 | A1* | 12/2007 | Sirgue et al. ............ 702/14 |
| 2009/0006000 | A1 | 1/2009 | Shin |
| 2010/0224362 | A1* | 9/2010 | Carazzone ........... 166/250.15 |
| 2010/0322032 | A1 | 12/2010 | Shin |

FOREIGN PATENT DOCUMENTS

| KR | 10-0945909 B1 | 3/2010 |
| KR | 10-1092668 B1 | 12/2011 |
| WO | WO 2011/100077 A1 | 8/2011 |

OTHER PUBLICATIONS

R. Gerhard Pratt et al., "Gauss-newton and full newton methods in frequency-space seismic waveform inversion," 1998, Geophysical Journal International, vol. 133, pp. 341-362.*
Shin, Changsoo et al. "Waveform inversion in the Laplace-Fourier domain", Geophys. J. Int. (2009) 177, 1067-1079 (13 pages, in English).
Pyun, Sukjoon et al. "3D acoustice waveform inversion in the Laplace domain using an iterative solver" Geophysical Prospecting, 2011, 59, 386-399 (14 pages, in English).
Bae, Ho Seuk et al. "2D acoustic-elastic coupled waveform inversion in the Laplace domain" Geophysical Prospecting, 2010, 58, 997-1010 (14 pages, in English).

(Continued)

*Primary Examiner* — Kamini S Shah
*Assistant Examiner* — Russ Guill
(74) *Attorney, Agent, or Firm* — NSIP Law

(57) ABSTRACT

The description relates to a seismic imaging technology technique for modeling a subsurface structure through waveform inversion in the Laplace domain. The seismic imaging system comprises a scaled gradient calculating unit calculating a scaled gradient, a modeling parameter updating unit updating the model parameters using the scaled gradient direction, and an iteration control unit controlling the scaled gradient calculating unit and the modeling parameter updating unit to repeat processing iteratively until a stopping criteria is met.

5 Claims, 2 Drawing Sheets

(56) References Cited

OTHER PUBLICATIONS

Kim, Myung Hoon et al. "2-D Frequency-domain Waveform Inversion of Coupled Acoustic-Elastic Media with an Irregular Interface" Pure and Applied Geophysics, vol. 166, Issue 12, pp. 1967-1985 (19 pages, in English).

Kang, Seung-Goo et al. "Laplace-Fourier-Domain Waveform Inversion for Fluid-Solid Media" Pure and Applied Geophysics vol. 169, Issue 12 (2 pages, in English).

Kang, Seung-Goo et al. "Laplace-Fourier-Domain Waveform Inversion for Fluid-Solid Media" Pure and Applied Geophysics vol. 169, 2012, pp. 2165-2179 (15 pages, in English).

* cited by examiner

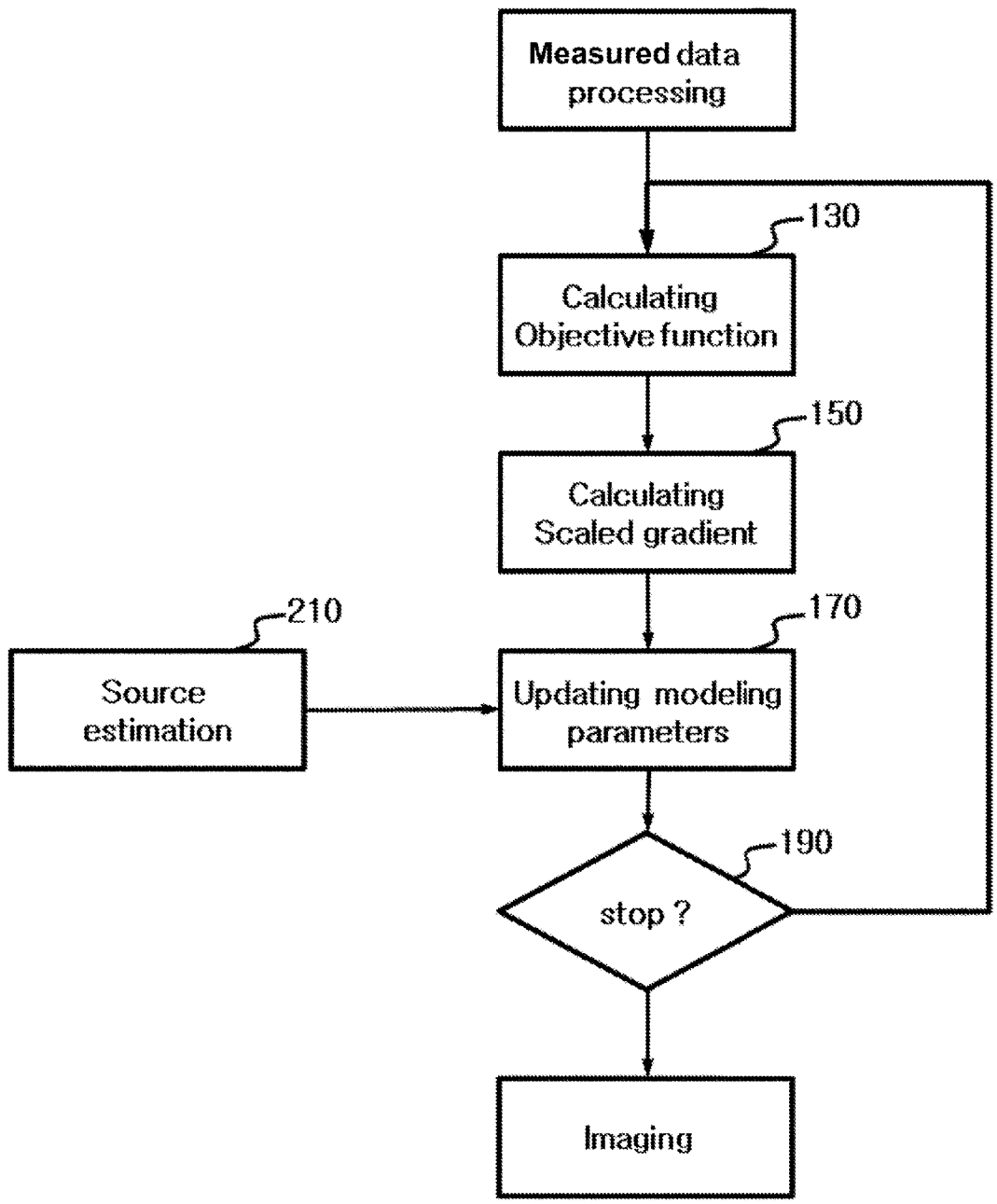

SEISMIC IMAGING SYSTEM FOR ACOUSTIC-ELASTIC COUPLED MEDIA USING ACCUMULATED LAPLACE GRADIENT DIRECTION

CROSS-REFERENCE TO RELATED APPLICATION

This application claims the benefit under 35 U.S.C. §119(a) of a U.S. Provisional Patent Application No. 61/610,070, filed on Mar. 13, 2012, the entire disclosure of which is incorporated herein by reference for all purposes.

BACKGROUND

1. Field

The following description relates to a seismic imaging technology technique for modeling a subsurface structure through waveform inversion in the Laplace domain.

2. Description of the Related Art

Technologies for imaging a subsurface structure through waveform inversion have been studied and developed. The full waveform inversion method was initially developed in the time domain to recover subsurface information. Later, this work was extended to the frequency domain. However, full waveform inversion methods have limitations due to local minima in their objective functions. Also, full waveform inversions of field data remain limited due to insufficient low-frequency information.

Recently, a Laplace-domain waveform inversion technique has been proposed to address problems associated with inversions in the frequency or time domains. See Shin, C., and Y. H. Cha, 2008, Waveform inversion in the Laplace domain: Geophysical Journal International, 173, 922-931; and Pyun, S., W. Son, and C. Shin, 2011, 3D acoustic waveform inversion in the Laplace domain using an iterative solver: Geophysical Prospecting, 59, 386-399. Also see Bae H. S., C. Shin, Y. H. Cha, Y. Choi, and D. J. Min, 2010, 2D acoustic-elastic coupled waveform inversion in the Laplace domain: Geophysical Prospecting, 58, 997-1010 and Kim, M. H., Y. Choi, Y. H. Cha, and C. Shin, 2009, 2-D frequency-domain waveform inversion of coupled acoustic-elastic media with an irregular interface: Pure and Applied Geophysics, 166, 1967-1985.

Laplace-domain waveform inversion could solve the problems of insufficient low-frequency information and local minima by using the zero-frequency component of a damped wavefield. Combining the work of Bae et al. (2010) and Kim et al. (2009) above, we have developed an inversion algorithm that can account for the effects of elastic waves in a marine environment and describe irregular submarine topography which was disclosed in Kang, S. G., H. Bae, and C. Shin, 2012, Laplace-Fourier domain waveform inversion for fluid-solid media: Pure and Applied Geophysics, 169, 2165-2179. However, the inversion can produce artifacts near the seafloor due to topography, and it requires longer streamers than required for frequency-domain inversions for the recovery of deep-water structures.

BRIEF DESCRIPTION OF THE DRAWINGS

FIG. 2 shows a flow diagram illustrating an exemplary seismic imaging method according to an embodiment.

DETAILED DESCRIPTION

Figure 1:
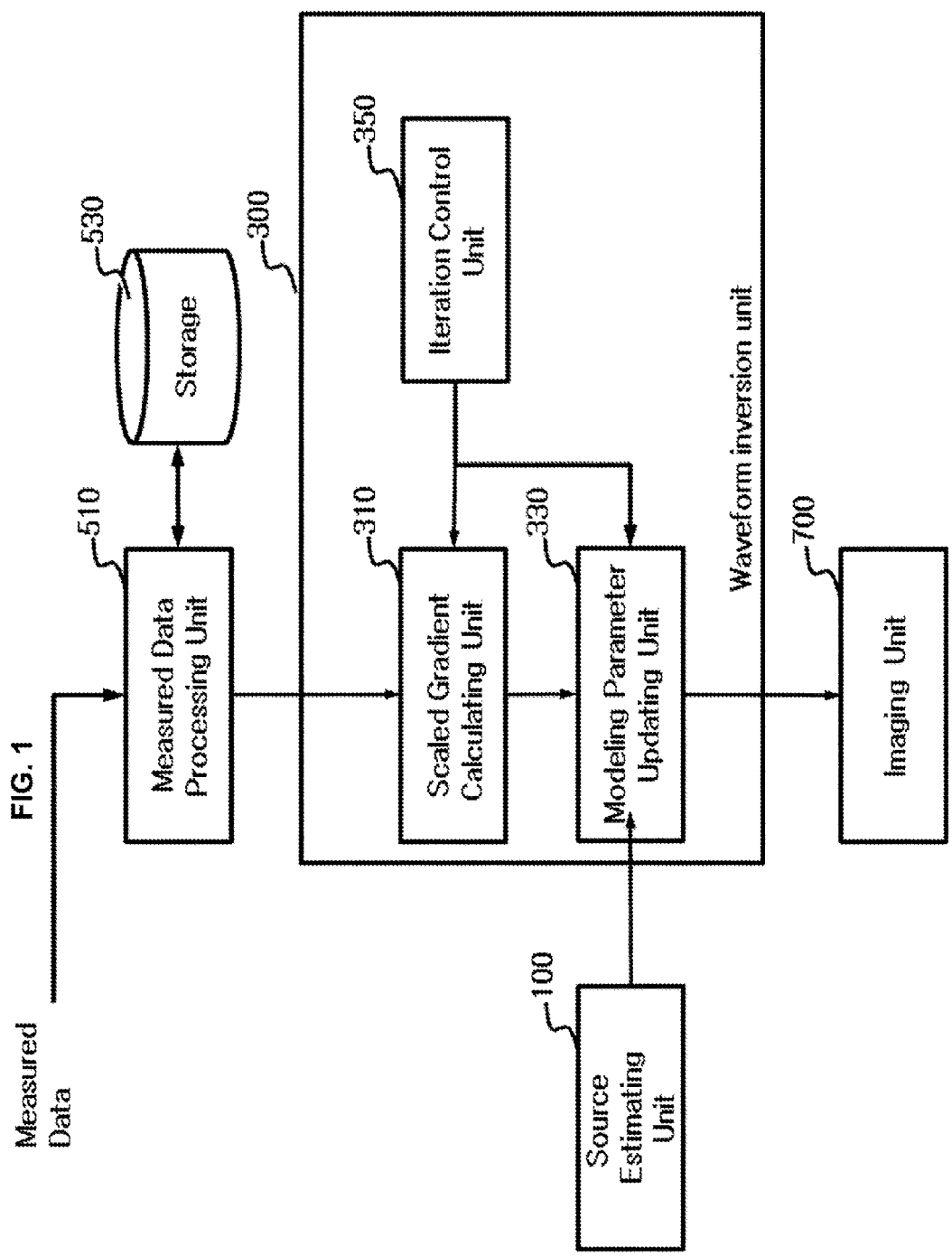
FIG. 1 is a block diagram showing an exemplary seismic imaging system according to an embodiment.

We propose a new gradient scaling method for the Laplace-domain waveform inversion. The gradient scaling direction is computed using the sum of the squares of the conventional gradient values accumulated with depth. The method is designed to enhance the recovery of high-velocity deep-water structures, such as salt domes, while suppressing artifacts related to the irregular seafloor.

According to one aspect of the present invention, a seismic imaging system using Laplace-domain wave equation in acoustic-elastic coupled media is disclosed. In one embodiment, seismic imaging system comprises a scaled gradient calculating unit calculating a scaled gradient, a modeling parameter updating unit updating the model parameters using the scaled gradient direction, and an iteration control unit controlling the scaled gradient calculating unit and the modeling parameter updating unit to repeat processing iteratively until a stopping criteria is met.

Scaled gradient calculating unit calculates a scaled gradient direction of an objective function by multiplying a gradient of the objective function and a accumulated gradient which is calculated using a vertically accumulated square sum of the original gradient values, wherein the objective function is defined by a residual of logarithmic wavefield in Laplace domain;

Modeling parameter updating unit updates the model parameters using the scaled gradient direction. The model parameters are defined for a discretized finite element equation for acoustic-elastic coupled media from a Laplace-transformed acoustic wave equation, a Laplace-transformed elastic wave equation and continuity conditions at the interface between the acoustic media and the elastic media.

According to another aspect of the present invention, the seismic imaging system may further comprise a source wavelet estimation unit estimating an unknown source wavelet from an initial source using a full Newton method and outputting the result to the modeling parameter updating unit.

According to one aspect of the present invention, a seismic imaging method using Laplace-domain wave equation in acoustic-elastic coupled media is proposed. The seismic imaging method comprises a step for calculating a scaled gradient direction of an objective function, a step for updating the model parameters using the scaled gradient direction and a step for repeating calculating the scaled gradient direction and updating the model parameters iteratively until a stopping criteria is met.

The step for calculating a scaled gradient direction calculates a scaled gradient direction of an objective function by multiplying a gradient of the objective function and an accumulated gradient which is calculated using a vertically accumulated square sum of the original gradient values, wherein the objective function is defined by a residual of logarithmic wavefield in Laplace domain.

The step for updating the model parameters updates the model parameters for a discretized finite element equation for acoustic-elastic coupled media from a Laplace-transformed acoustic wave equation, a Laplace-transformed elastic wave equation and continuity conditions at the interface between the acoustic media and the elastic media.

According to another aspect of the present invention, the step for updating the model parameters may further comprise a step for estimating an unknown source wavelet from an initial source using a full Newton method.

We use a modeling technique for acoustic-elastic coupled media in the Laplace domain to accommodate elastic waves in a marine environment. In this technique, wave propagation in acoustic media may be described by pressure governed by the acoustic wave equation, whereas wave propagation in elastic media may be expressed by either particle displacements or velocity governed by the elastic wave equations. See Bae H. S., C. Shin, Y. H. Cha, Y. Choi, and D. J. Min, 2010, 2D acoustic-elastic coupled waveform inversion in the Laplace domain: Geophysical Prospecting, 58, 997-1010. Accordingly, the proposed modeling technique for acoustic-elastic coupled media makes it possible to describe elastic wave phenomena, such as mode-converted waves and SV waves in a marine environment, unlike modeling using acoustic approximations.

The Laplace-transformed acoustic wave equation is defined as $$-\frac{s^2}{c^2}\tilde{p} = \frac{\partial^2 \tilde{p}}{\partial x^2} + \frac{\partial^2 \tilde{p}}{\partial z^2} + \tilde{f}, \quad (1)$$

where $\tilde{p}(ix,iz,s)$ is the Laplace-transformed pressure field in acoustic media; ix and iz are indices of the x-axis (horizontal direction) and z-axis (depth or vertical direction) elements of the modeling domain, respectively; $c(ix,iz)$ is the P-wave velocity in the acoustic medium; and $\tilde{f}$ is the source term.

For elastic media, the wave equation in the Laplace domain can be expressed as $$-\rho_E s^2 \tilde{h} = \frac{\partial}{\partial x}\left((\lambda+2\mu)\frac{\partial \tilde{h}}{\partial x} + \lambda\frac{\partial \tilde{v}}{\partial z}\right) + \frac{\partial}{\partial z}\left(\mu\left(\frac{\partial \tilde{v}}{\partial x} + \frac{\partial \tilde{h}}{\partial z}\right)\right) \quad (2)$$

$$-\rho_E s^2 \tilde{v} = \frac{\partial}{\partial x}\left(\mu\left(\frac{\partial \tilde{v}}{\partial x} + \frac{\partial \tilde{h}}{\partial z}\right)\right) + \frac{\partial}{\partial z}\left(\lambda\frac{\partial \tilde{h}}{\partial x} + (\lambda+2\mu)\frac{\partial \tilde{v}}{\partial z}\right),$$

where $\rho_E(ix,iz)$ is density; $\lambda$ and $\mu$ are the Lamé constants; and $\tilde{h}(ix,iz,s)$ and $\tilde{v}(ix,iz,s)$ are the Laplace-transformed horizontal and vertical displacements, respectively, in elastic media.

According to Zienkiewicz, O. C., R. L. Taylor, and J. Z. Zhu, 2005, *The finite element method: its basis and fundamentals*: Butterworth-Heinemann, Oxford, at the interface between acoustic and elastic media, the continuity condition of the normal component of particle velocity is $$\nabla \tilde{p} \cdot n = \rho_A s^2 \cdot n, \quad (3)$$

where n is the unit normal vector from the interface and $\rho_A$ is the density in acoustic media.

Also, according to Komatitsch, D., C. Barnes, and J. Tromp, 2000, Wave propagation near a fluid-solid interface: A spectral-element approach:Geophysics,65, 623-631, the stress continuity condition can be described as $$\sigma \cdot n = -\tilde{p} \cdot n, \quad (4)$$

where $\sigma$ is the symmetric second-order stress tensor.

Following the finite element method, we can obtain the discretized finite element equation for acoustic-elastic coupled media. The discretized finite element equation of the coupled wave equation with interface conditions can be expressed using a full matrix form:

$$\begin{pmatrix} \frac{K^A + s^2}{c^2 M^A} & \rho_A s^2 Q^A \sin\theta & \rho_A s^2 Q^A \cos\theta \\ [Q^E]^T \sin\theta & K^{11} - \rho_E s^2 M^{11} & K^{12} \\ [Q^E]^T \cos\theta & K^{21} & K^{22} - \rho_E s^2 M^{22} \end{pmatrix} \begin{pmatrix} \tilde{p}(s) \\ \tilde{h}(s) \\ \tilde{v}(s) \end{pmatrix} = \begin{pmatrix} \tilde{f}(s) \\ 0 \\ 0 \end{pmatrix}, \quad (5)$$

where s is the Laplace coefficient; $K^A$ is the stiffness matrix for fluid media; $K^{11}$, $K^{12}$, $K^{21}$ and $K^{21}$ are the stiffness matrices for solid media; $M^A$ designates the mass matrix for fluid media; $M^{11}$ and $M^{22}$ are the mass matrices for solid media; $Q^A$ and $Q^E$ are the interface boundary matrices in fluid and solid media, respectively; $\theta$ is the slope of the interface between the fluid and solid layers; $\tilde{p}(s)$ is a pressure-field vector; and $\tilde{h}(s)$ and $\tilde{v}(s)$ are the horizontal and vertical displacements in the Laplace domain for solid media, respectively (Kim et al., 2010). The Laplace-transformed pressure, horizontal displacement and vertical displacement vectors—$\tilde{p}(s)$, $\tilde{h}(s)$ and $\tilde{v}(s)$, respectively—and the source term $\tilde{f}(s)$ can be derived from the time-domain wavefield using the Laplace transform:

$$\tilde{p}(s) = \int_0^\infty p(t)e^{-st}dt, \quad (6)$$

$$\tilde{h}(s) = \int_0^\infty h(t)e^{-st}dt, \quad (7)$$

$$\tilde{v}(s) = \int_0^\infty v(t)e^{-st}dt, \quad (8)$$

$$\tilde{f}(s) = \int_0^\infty f(t)e^{-st}dt. \quad (9)$$

We can simplify equation (5) using the impedance matrix S:

$$S\tilde{u} = \tilde{f}, \quad (10)$$

where $\tilde{u}$ is the Laplace-domain wavefield vector containing the pressure field and the horizontal and vertical displacements.

FIG. 1 is a block diagram showing an exemplary seismic imaging system according to an embodiment. As shown in the figure, the seismic imaging system comprises a scaled gradient calculating unit 310 calculating a scaled gradient, a modeling parameter updating unit 330 updating the model parameters using the scaled gradient direction, and an iteration control unit 350 controlling the scaled gradient calculating unit and the modeling parameter updating unit to repeat processing iteratively until a stopping criteria is met.

Scaled gradient calculating unit 310 calculates a scaled gradient direction of an objective function by multiplying a gradient of the objective function and a accumulated gradient which is calculated using a vertically accumulated square sum of the original gradient values, wherein the objective function is defined by a residual of logarithmic wavefield in Laplace domain.

Modeling parameter updating unit 330 updates the model parameters using the scaled gradient direction. The model parameters are defined for a discretized finite element equation for acoustic-elastic coupled media from a Laplace-transformed acoustic wave equation, a Laplace-transformed elastic wave equation and continuity conditions at the interface between the acoustic media and the elastic media.

We use the Laméconstants, lambda ($\lambda$) and mu ($\mu$), and density ($\rho_E$) as the elastic model parameters for the waveform inversion. After obtaining the inversion results, Imaging unit 700 converts this Laméconstantsinto P-wave velocity, S-wave velocity and density. Further, imaging unit 700 generates an image showing the distribution of this velocities thus resulting in submarine subsurface image.

The Laplace-domain wavefield is the damped wavefield about a given Laplace constant s, and it has very small values, unlike those in the frequency domain. In this case, the logarithmic objective function is more useful than the conventional $l_2$-norm objective function for measuring the residuals. Many studies associated with Laplace-domain waveform inversions have already presented successful results using the logarithmic objective function. The logarithmic objective function for our Laplace-domain waveform inversion at a given Laplace damping constant can be written as:

$$E(k_{(ix,iz)}) = \frac{1}{2}\sum_{i=1}^{n_s}\sum_{j=1}^{n_r} \delta\tilde{r}_{ij}\delta\tilde{r}_{ij} \tag{11}$$

$$\delta\tilde{r}_{ij} = \ln\left(\frac{\tilde{u}_{ij}}{\tilde{d}_{ij}}\right), \tag{12}$$

where $\tilde{d}_{ij}$, $\tilde{u}_{ij}$ and $\delta\tilde{r}_{ij}$ are the observed wavefield, the modeled wavefield and the residual at the $j^{th}$ receiver by the $i^{th}$ source, respectively. The values $n_s$ and $n_r$ are the total numbers of sources and receivers, respectively. Measured Data Processing Unit 510 converts a measured data into a Laplace domain data and stores the data in a Storage 530. Using the back-propagation algorithm well known by Tarantola, Scaled Gradient Calculating Unit 310 calculates the gradient of the objective function with respect to a model parameter $k_{(ix,iz)}$ by $$\nabla_{k_{(ix,iz)}} E(ix, iz) = Re\left[\sum_{i=1}^{n_s} \left(v_{k_{(ix,iz)}}\right)^T S^{-1} \delta\tilde{r}_i\right], \tag{13}$$

where $$v_{k_{(ix,iz)}} = -\frac{\partial S}{\partial k_{(ix,iz)}}\tilde{u}_i; \tag{14}$$

$$\delta\tilde{r}_i = \begin{bmatrix} \ln(\tilde{u}_{i1}/\tilde{d}_{i1})/u_{i1} \\ \ln(\tilde{u}_{i2}/\tilde{d}_{i2})/u_{i2} \\ \vdots \\ \ln(\tilde{u}_{i,nr}/\tilde{d}_{i,nr})/u_{i,nr} \\ 0 \\ \vdots \\ 0 \end{bmatrix}; \tag{15}$$

$v_{k_{(ix,iz)}}$ is the virtual source term; and $\tilde{u}_i$ and $\delta\tilde{r}_i$ are the wavefield and the residual for the $i^{th}$ source, respectively.

According to an aspect of the present invention, seismic imaging system uses a gradient scaling algorithm using the accumulated gradient, which is calculated using the vertically accumulated square sum of the original gradient values. This procedure can be described as $$\nabla_{k_{(ix,iz)}} E_{acc}(ix, 1) = \left[Re\left[\sum_{i=1}^{n_s}\left(v_{k_{(ix,1)}}\right)^T S^{-1} \delta r_i\right]\right]^2 \tag{16}$$

$$= \left[\nabla_{k_{(ix,iz)}} E(ix, 1)\right]^2,$$

$$ix = 1, \ldots, nx.$$

Equation (16) gives the accumulated gradient of the conventional gradient at the first horizontal layer (iz=1). Then, we obtain the accumulated gradient sequentially:

$$\nabla_{k_{(ix,iz)}} E_{acc}(ix, iz) = \nabla_{k_{(ix,iz)}} E_{acc}(ix, iz-1) + \left[\nabla_{k_{(ix,iz)}} E(ix, iz)\right]^2, \tag{17}$$

$$ix = 1, \ldots, nx, \quad iz = 2, \ldots, nz.$$

After obtaining the accumulated gradient $\nabla_{k_{(ix,iz)}} E_{acc}(ix,iz)$, Scaled Gradient Calculating Unit 310 computes the scaled gradient direction $\nabla_{k_{(ix,iz)}} E_L(ix,iz)$ by multiplying the conventional gradient and the accumulated gradient:

$$\nabla_{k_{(ix,iz)}} E_L(ix, iz) = \left[\nabla_{k_{(ix,iz)}} E(ix, iz) \cdot \nabla_{k_{(ix,iz)}} E_{acc}(ix, iz)\right]. \tag{18}$$

The accumulated gradient is always positive, and the resultant gradient vector is a rescaled gradient. After calculating the scaled gradient direction of the objective function, Modeling Parameter Updating Unit 330 updates the model parameters as following:

$$k_{(ix,iz)}^{l+1} = k_{(ix,iz)}^l - \alpha^l \sum_{s=1}^{ns} NRM\left[\frac{\nabla_{k_{(ix,iz)}} E_L(ix, iz)}{\left[\sum_{i=1}^{n_s}\left(v_{k_{(ix,iz)}}\right)^T \cdot v_{k_{(ix,iz)}} + \eta\right]}\right], \tag{19}$$

where l is the iteration number, $\alpha^l$ is the step length at the $l^{th}$ iteration, ns is the total number of Laplace damping constants, NRM is a normalizing operator (Ha et al., 2009) and $\eta$ is a stabilizing factor. Details of this are described in Shin, C., and Y. H. Cha, 2008, Waveform inversion in the Laplace domain: Geophysical Journal International, 173, 922-931.

According to another aspect of the present invention, the seismic imaging system may further comprise a source wavelet estimation unit 100 estimating an unknown source wavelet from an initial source using a full Newton method and outputting the result to the modeling parameter updating unit. Details of this full Newton method is explained in Shin, C., S. Pyun, and J.B. Bednar, 2007, Comparison of waveform inversion, part 1: conventional wavefield vs logarithmic wavefield: Geophysical Prospecting, 55, 449-464.

FIG. 2 shows a flow diagram illustrating an exemplary seismic imaging method according to an embodiment. As shown in the figure, the seismic imaging method comprises steps 130, 150 for calculating a scaled gradient direction of an objective function, a step 170 for updating the model parameters using the scaled gradient direction and a step 190 for repeating calculating the scaled gradient direction and updating the model parameters iteratively until a stopping criteria is met.

In step 130, an objective function defined by a residual of logarithmic wavefield in Laplace domain is calculated. In step 150, a scaled gradient direction of an objective function is calculated by multiplying a gradient of the objective function and an accumulated gradient which is calculated using a vertically accumulated square sum of the original gradient values.

In step 170, model parameters are updated for a discretized finite element equation for acoustic-elastic coupled media which comprises a Laplace-transformed acoustic wave equation, a Laplace-transformed elastic wave equation and continuity conditions at the interface between the acoustic media and the elastic media.

According to another aspect of the present invention, in step 210 an unknown source wavelet is estimated from an initial source using a full Newton method and supplied to Updating modeling parameters step 170.

Present invention has been described above by an exemplary embodiment. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A seismic imaging system using Laplace-domain wave equation in acoustic-elastic coupled media, comprising:
   a scaled gradient calculating hardware circuit calculating a scaled gradient direction of an objective function by multiplying a gradient of the objective function and an accumulated gradient, wherein the accumulated gradient is calculated using a vertically accumulated square sum of original gradient values by summing an accumulated gradient of a previous vertical layer and a square of the gradient of the objective function, and the objective function is defined by a residual of logarithmic wavefield in Laplace domain;
   a modeling parameter updating hardware circuit updating model parameters for a discretized finite element equation for the acoustic-elastic coupled media from a Laplace-transformed acoustic wave equation, a Laplace-transformed elastic wave equation and continuity conditions at an interface between an acoustic media and an elastic media of the acoustic-elastic coupled media;
   an iteration control hardware circuit controlling the scaled gradient calculating circuit and the modeling parameter updating hardware circuit to repeat processing iteratively until a stopping criteria is met; and
   an imaging hardware circuit converting Lamè constants into P-wave velocity, S-wave velocity, and density and generating a submarine subsurface image showing the distribution of P-wave and S-wave velocities.

2. The seismic imaging system in claim 1, wherein the system further comprises a source wavelet estimation hardware circuit estimating an unknown source wavelet from an initial source using a full Newton method and outputting the result to the modeling parameter updating hardware circuit.

3. The seismic imaging system of claim 1, wherein the accumulated gradient is always positive.

4. A seismic imaging method using Laplace-domain wave equation in acoustic-elastic coupled media, comprising:
   calculating, using a scaled gradient calculation hardware circuit, a scaled gradient direction of an objective function by multiplying a gradient of the objective function and an accumulated gradient, the accumulated gradient being calculated using a vertically accumulated square sum of original gradient values by summing an accumulated gradient of a previous vertical layer and a square of the gradient of the objective function, wherein the objective function is defined by a residual of logarithmic wavefield in Laplace domain;
   updating model parameters for a discretized finite element equation for the acoustic-elastic coupled media from a Laplace-transformed acoustic wave equation, a Laplace-transformed elastic wave equation and continuity conditions at an interface between an acoustic media and an elastic media of the acoustic-elastic coupled media;
   repeating calculating the scaled gradient direction and updating the model parameters iteratively until a stopping criteria is met; and
   converting, using an imaging hardware circuit, Lamè constants into P-wave velocity, S-wave velocity, and density and generating a submarine subsurface image showing the distribution of P-wave and S-wave velocities.

5. The seismic imaging method in claim 4, wherein updating the model parameters includes estimating an unknown source wavelet from an initial source using a full Newton method.

* * * * *